United States Patent
Jenko

[11] Patent Number: 6,135,757
[45] Date of Patent: Oct. 24, 2000

[54] VALVE GATED INJECTION MOLDING SYSTEM

[75] Inventor: Edward J. Jenko, Essex Junction, Vt.

[73] Assignee: Husky Injection Systems Ltd., Canada

[21] Appl. No.: 09/173,783

[22] Filed: Oct. 16, 1998

[51] Int. Cl.$^7$ .................................................. B29C 45/23
[52] U.S. Cl. .......................................... 425/562; 425/564
[58] Field of Search ................................... 425/562, 563, 425/564, 565, 566

[56] References Cited

U.S. PATENT DOCUMENTS

| | | | |
|---|---|---|---|
| 4,781,572 | 11/1988 | Boring | 425/564 |
| 4,923,387 | 5/1990 | Gellert | 425/549 |
| 5,423,672 | 6/1995 | Gordon | 425/564 |
| 5,695,793 | 12/1997 | Bauer | 425/564 |
| 5,849,343 | 12/1998 | Gellert et al. | 425/564 |

FOREIGN PATENT DOCUMENTS 92-62872  10/1997  Japan ........................... B29C 45/28

*Primary Examiner*—Tim Heitbrink
*Attorney, Agent, or Firm*—Fitzpatrick, Cella, Harper & Scinto

[57] ABSTRACT

A novel valve gated injection molding system and valve gate reduces the formation of gate vestiges on parts molded therewith and enhances cooling of the tip of the valve stem during the cooling portion of an injection molding cycle. Channels are provided and extend from an area adjacent the contact area of the sealing portions of the stem tip and gate to the melt channel of the injection nozzle. These channels allow material, which would otherwise form a thin film layer in the contact area of the sealing portions of the stem tip and gate, to be expressed through the channels and back to the injection nozzle. As the formation of thin films is inhibited, an increased contact area, in addition to the contact area of the tip and gate sealing portions, can be provided to improve the transfer of heat energy from the tip to the gate when the gate is cooled.

15 Claims, 7 Drawing Sheets

VALVE GATED INJECTION MOLDING SYSTEM

FIELD OF THE INVENTION

The present invention relates to an injection molding system and to a novel valve gate therefore. More specifically, the present invention relates to a valve gated injection molding system, and a valve gate therefore, in which the valve is constructed to provide sealing of the gate and good thermal transfer characteristics between the valve gate and the valve stem while reducing the gate vestige on molded parts by inhibiting or reducing the formation of thin film layers between the sealing portions of the gate and valve stem.

BACKGROUND OF THE INVENTION

Injection molding nozzles are well known and are used to inject materials, such as plastic, into the cavity of a mold. For example, such nozzles receive molten material, such as plastic, from an injection molding machine and direct the same into a mold cavity through a passage called a gate. When an injection operation is complete, and prior to opening the mold cavity to eject the molded part, the transfer of molten material through the gate must be stopped. Generally, two methods exist for stopping the transfer of molten material through the gate, namely: thermal, or open, gating; and valve gating.

In thermal gating, the gate is an open aperture through which molten material passes during an injection operation. The gate is rapidly cooled at the end of the injection portion of the cycle, when the injection pressure is removed, to "freeze" the injected material into a plug. This plug remains in the gate to prevent drool of molten material from the gate when the mold is open for the ejection of the molded part. In the next injection portion of the cycle, the cooling applied to the gate is removed and hot molten material from the injection molding machine pushes the plug into the mold cavity, where it melts and mixes with the newly provided molten material.

In valve gating, the opening and closing of the gate is independent of injection pressure and/or cooling and is achieved mechanically with a valve stem. This stem can be moved between an open position, wherein flow of molten materials through the gate is permitted, and a closed position wherein the gate is closed by entry of the valve stem into the gate which establishes a seal, preventing molten materials from passing through the gate. Valve gating is well known and examples of such systems are shown in U.S. Pat. Nos. 2,878,515; 3,023,458; and 3,530,539.

Generally, valve gating is preferable to thermal gating because it can reduce the undesired gate vestige which results on the finished molded part. However, there are problems with valve gating systems.

Specifically, the valve stem and gate each have a complementary sealing portion, usually tapered, which are brought into contact to seal the gate. As the sealing portion of the stem of the valve gate is moved into contact with the sealing portion of the gate, a thin film layer of molten material can be trapped between the sealing portions of the gate and the stem. This thin film layer can prevent the tip of the valve stem from fully extending into the gate and, consequently, the molded part can have an unacceptable gate vestige, in the form of a projection or "crown" in the gate area. Generally, the larger the sealing portions of the stem and gate, the more problematic the thin film layer becomes as more material must be expressed out of the contact area of the sealing surfaces and must be moved further to exit the contact area, making it more likely that some material will remain as a thin film layer. Thus, it is desired to reduce the contact area between the stem and gate by having small sealing portions.

Also, as the tip of the stem is in the flow of molten material when the gate is open, it can become quite hot. When the gate is closed by the stem, the hot tip of the stem can be difficult to cool as the mold cavity is cooled and this can result in a need for increased cycle times to permit the necessary cooling, and/or can result in undesirable characteristics in the molded part. Specifically, as the material in the mold cavity adjacent the stem tip is cooled less efficiently due to the hot tip, parts molded from thermally sensitive materials such as PET can suffer from crystalinity or other undesired characteristics.

Cooling the stem tip is subject to two problems. First, the above-mentioned thin layer can prevent cooling of the stem tip, by acting as an insulator between the stem tip and the cooled gate, and can aggravate the problem of tip cooling and its related undesired consequences. Second, as mentioned above, in order to reduce the size and/or probability of presence of a thin film layer and the gate vestige which can result therefrom, the sealing portions of the gate and the valve stem are usually kept small. However, the resulting relatively small contact area between the stem tip and the gate reduces the rate of thermal transfer of heat from the stem tip to the cooled gate.

SUMMARY OF THE INVENTION

It is an object of the present invention to provide a novel valve-gated injection molding system and a valve gate therefore which obviates or mitigates at least one of the disadvantages of the prior art.

The present invention overcomes the above-mentioned problems by inhibiting formation of a thin film layer between the stem tip and the gate to reduce gate vestiges and by allowing increased contact areas at and adjacent the sealing portions of the stem and gate to enhance cooling of the stem tip.

According to a first aspect of the present invention, there is provided a valve gate for opening and closing a mold gate between a melt channel in an injection molding nozzle and a mold cavity, comprising:

a mold gate including a tapered portion having a gate sealing portion;

a valve stem having a tip including a tapered portion having a stem sealing portion, at least one of said tapered portion of said mold gate and said tapered portion of said stem further including a plurality of channels extending from an area adjacent said respective sealing portion to said injection molding nozzle; and an operating means connected to said valve stem and operable to move said valve stem between an open position, wherein molten material can flow from said melt channel into said mold cavity, and a closed position, wherein said tip sealing portion engages said gate sealing portion to prevent flow of said molten material from said melt channel into said mold cavity and express molten material from between said sealing portions into said channels.

According to another aspect of the present invention, there is provided a valve gated injection molding system comprising:

a mold gate including a tapered portion having a gate sealing portion;

a injection molding nozzle having a melt channel to provide molten material from an injection molding machine to said mold gate;

a valve stem having a tip including a tapered portion having a stem sealing portion, at least one of said tapered portion of said mold gate and said tapered portion of said stem further including a plurality of channels extending from an area adjacent said respective sealing portion to said melt channel; and an operating means connected to said valve stem and operable to move said valve stem between an open position, wherein molten material can flow from said melt channel through said mold gate, and a closed position, wherein said tip sealing portion engages said gate sealing portion to prevent flow of said molten material from said melt channel through said mold gate and express molten material from between said sealing portions into said channels.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Before discussing embodiments of the present invention, a prior art valve gate system will first be discussed, for clarity, with reference to FIGS. 1 through 3.

Figure 1:
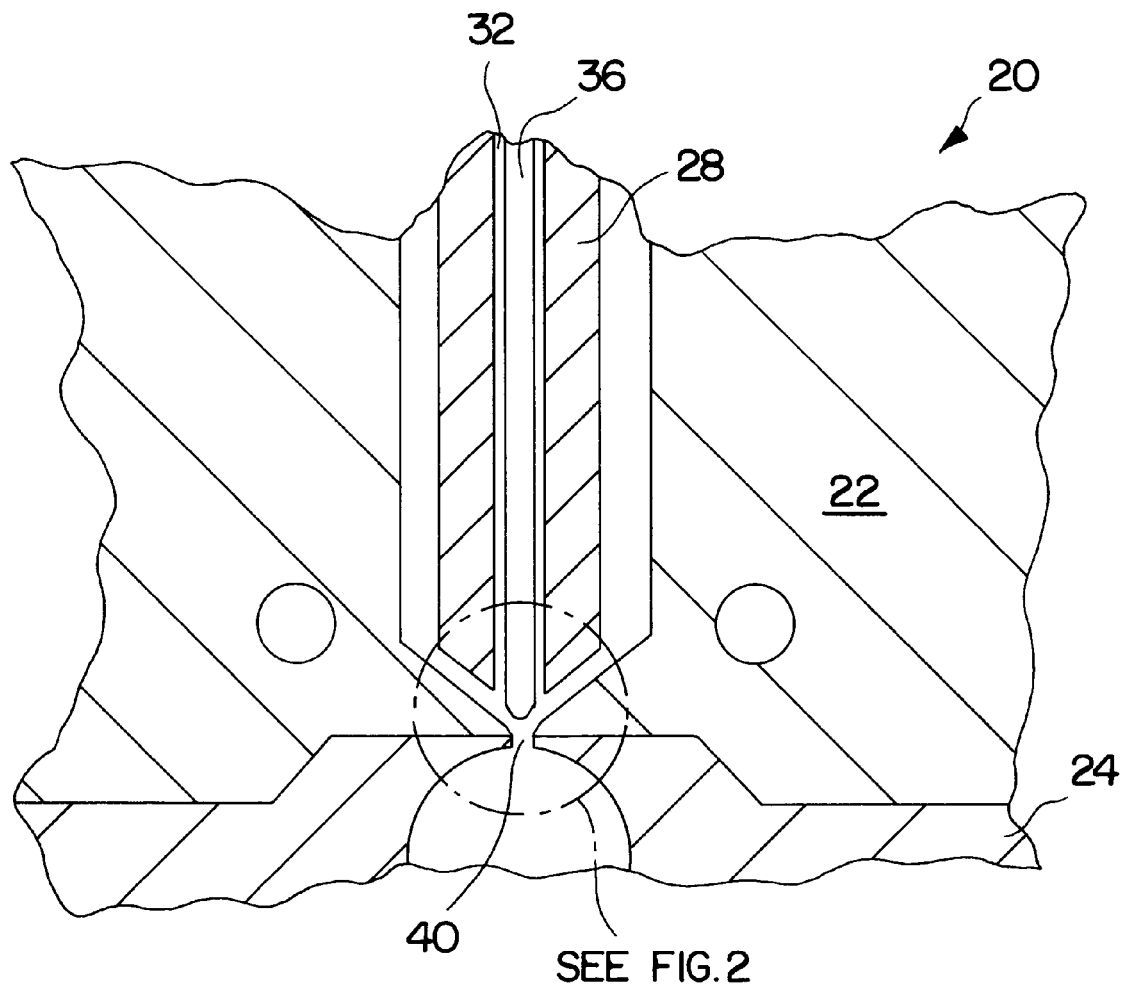
FIG. 1 shows a sectional view of a portion of a prior art valve gated injection molding system.

In FIG. 1, a portion of an injection molding system 20 including a mold plate 22 and a mold cavity 24 are shown. System 20 includes an injection nozzle 28 which can have appropriate heater units (not shown) in or on it and which has a central melt channel 32. A valve stem 36 is located in the center of melt channel 32 and can be moved, by any suitable actuating means (not shown), along melt channel 32 to close or open mold gate 40.

Figure 2:
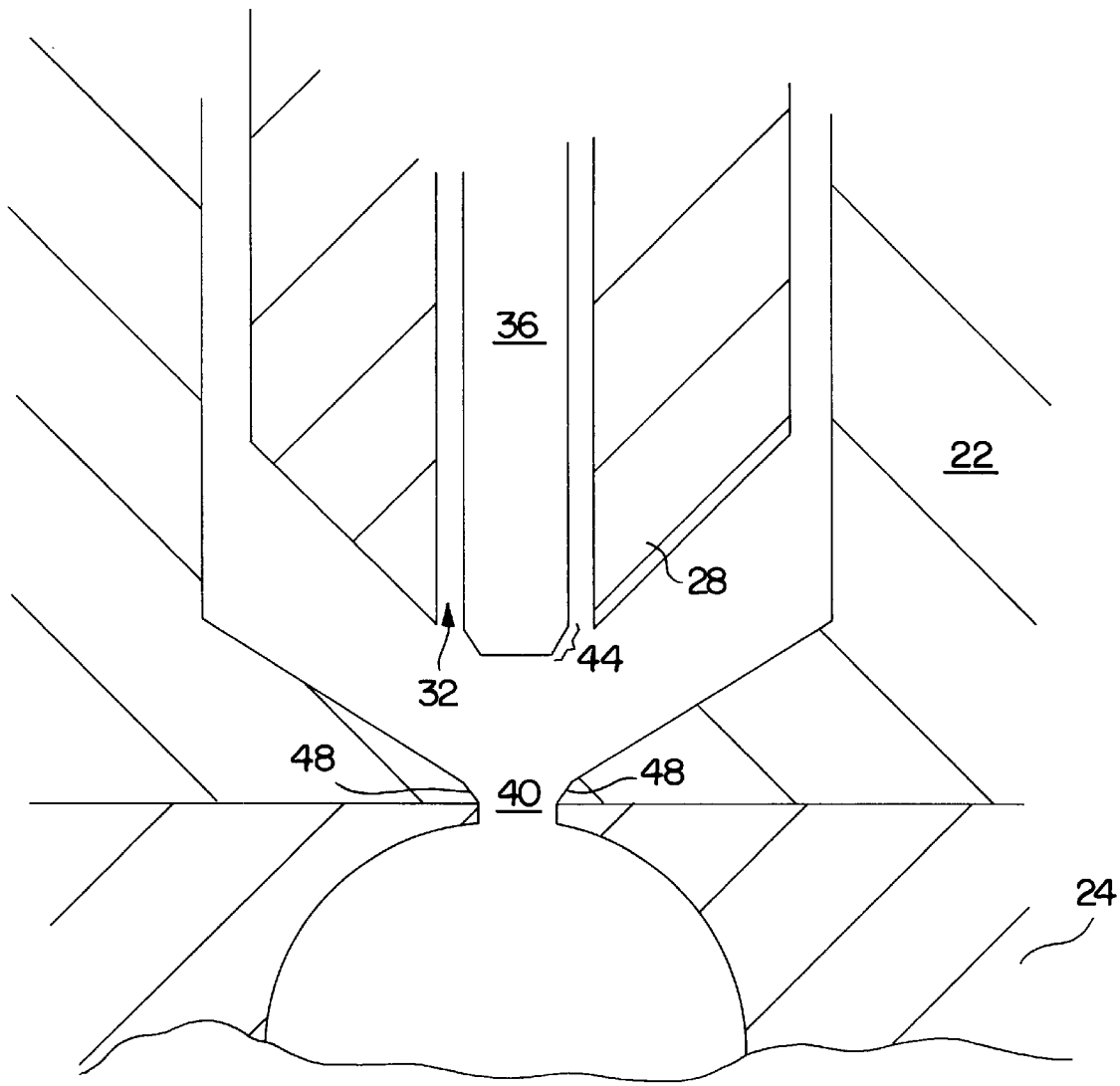
FIG. 2 shows an expanded view of the region of FIG. 1 within the circle labelled A.

As best seen in FIG. 2, stem 36 includes a tip with a tapered tip sealing portion 44 which is tapered to be complementary in size and shape to the inclined walls forming gate sealing portion 48 of gate 40. When stem 36 is moved to close gate 40, tip sealing portion 44 engages gate sealing portion 48 to close gate 40. In addition to closing gate 40, the contact between tip sealing portion 44 and gate sealing portion 48 allows the transfer of heat to occur from the tip of stem 36 to mold plate 22 and to mold cavity 24, each of which is cooled by a cooling means such as circulated cooling water, when an injection operation is completed.

Figure 3:
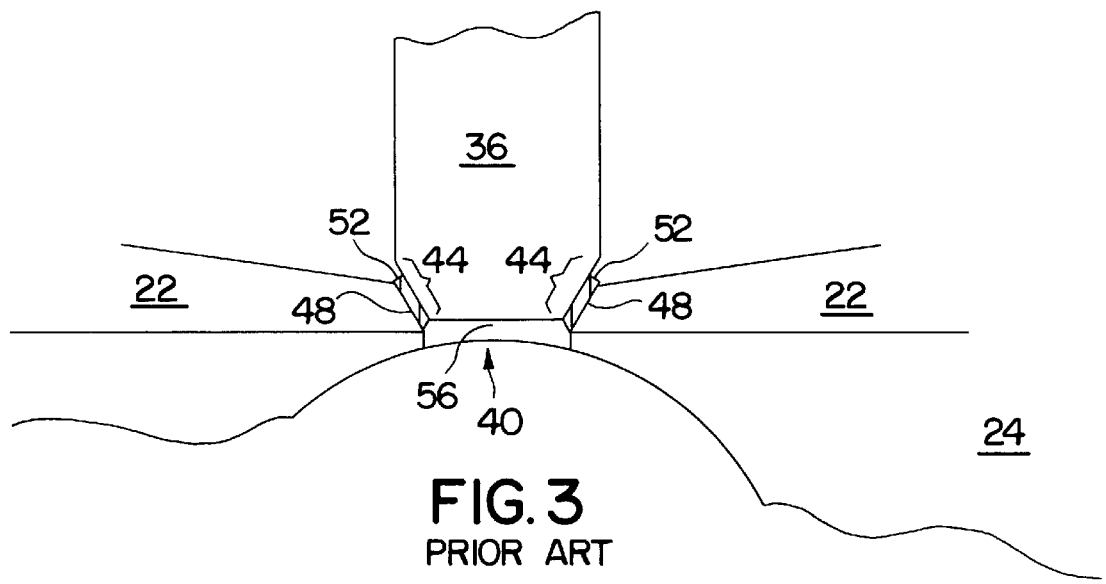
FIG. 3 shows an expanded view of the valve stem tip of FIG. 1 closing the gate of FIG. 1 with a thin film of material inhibiting complete entry of the stem tip into the gate.
Figure 4:
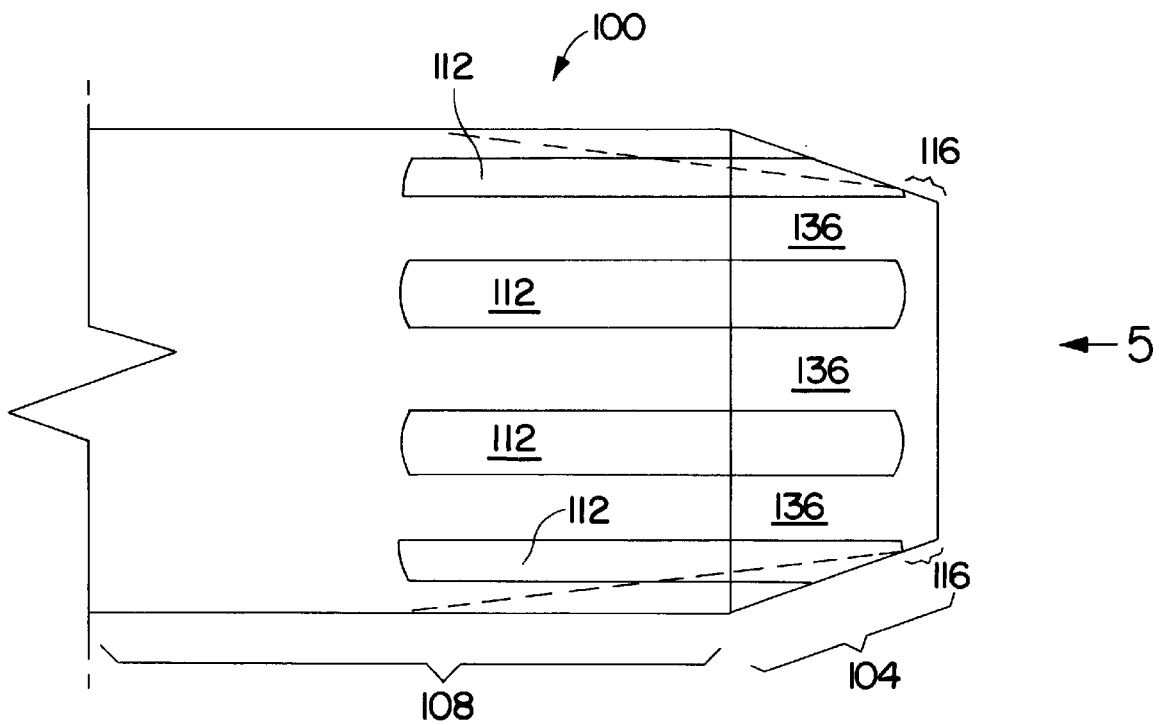
FIG. 4 shows an enlarged side view of the tip portion of a valve stem in a valve gated injection molding system accordance with the present invention.
Figure 5:
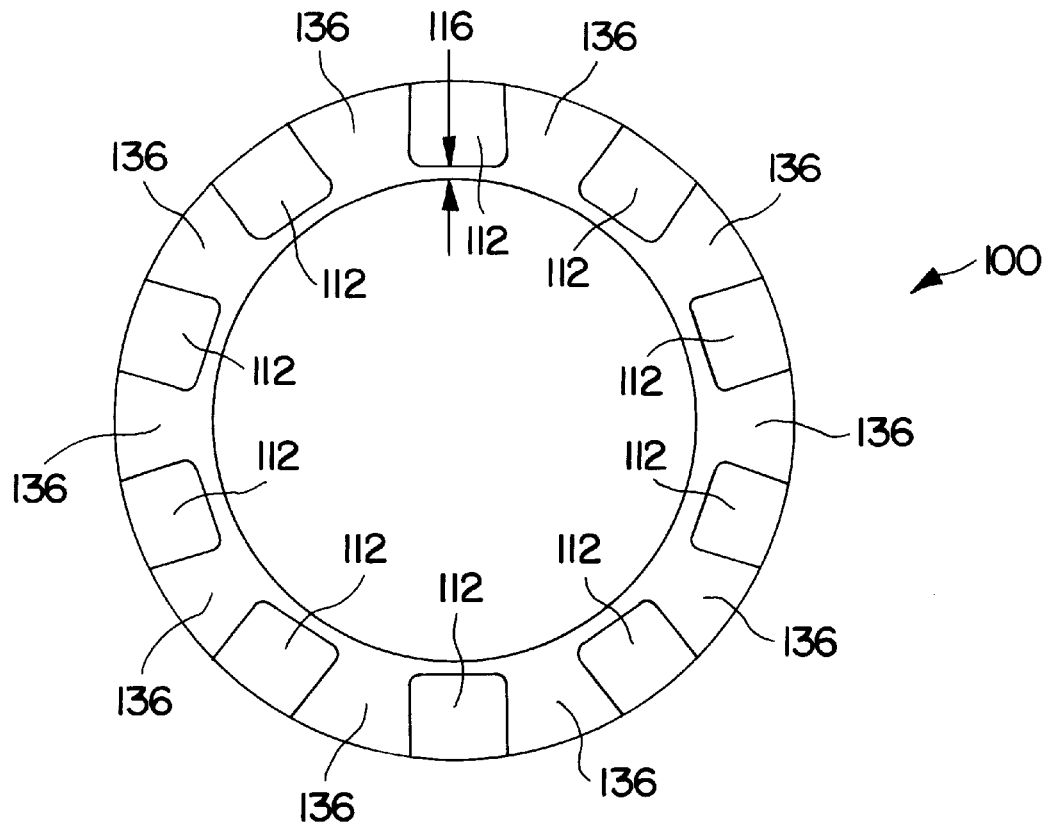
FIG. 5 shows a view of the valve stem of FIG. 4 in the direction indicated by arrow B in FIG. 4.
Figure 6:
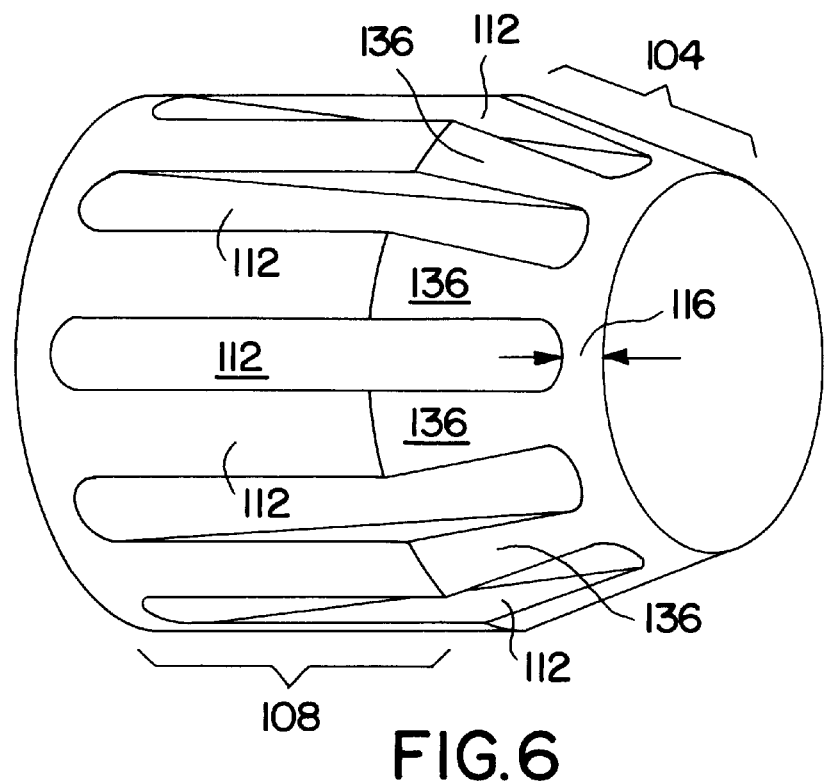
FIG. 6 shows a perspective view of the tip of the valve stem of FIGS. 4 and 5.

FIG. 3 shows gate 40 closed by stem 36. As shown in the Figure, when tip sealing portion 44 is brought into proximity of gate sealing portion 48, a thin layer 52 of molten material is trapped between gate sealing portion 48 and tip sealing portion 44, preventing stem 36 from completely entering and/or contacting gate 40. As stem 36 does not completely enter gate 40, a small undesired volume 56 is created adjacent the tip of stem 36 and material can fill volume 56 to create an undesired gate vestige on the molded part. Also, layer 52 acts as a thermal insulator to inhibit the transfer of heat from the tip of stem 36 to the cooler mold plate 22 and mold cavity 24 during the cooling cycle. As shown in the Figures, tip sealing portion 44 and gate sealing portion 48 are designed to be relatively small to reduce the size of the layer of material trapped therebetween.

FIGS. 4, 5, 6 and 7 show a tip 100 of a valve stem in accordance with an embodiment of the present invention. As shown, tip 100 includes a tapered portion 104 and a shaft 108 and includes a plurality of channels 112 which extend from tapered portion 104 to shaft 108. In a preferred embodiment of the present invention, shaft 108 is hollow and air filled, reducing the mass of stem 100 and thus reducing the heat retaining properties of stem 36. Tapered portion 104 includes, distal shaft 108, a relatively small tip sealing portion 116 into which channels 112 do not extend.

Channels 112 allow material which would otherwise be trapped between the tip sealing portion 116 and the complementary gate sealing portion of a gate to be expressed from the sealing portions of the tip and gate, through channels 112, to the nozzle melt channel.

Figure 7:
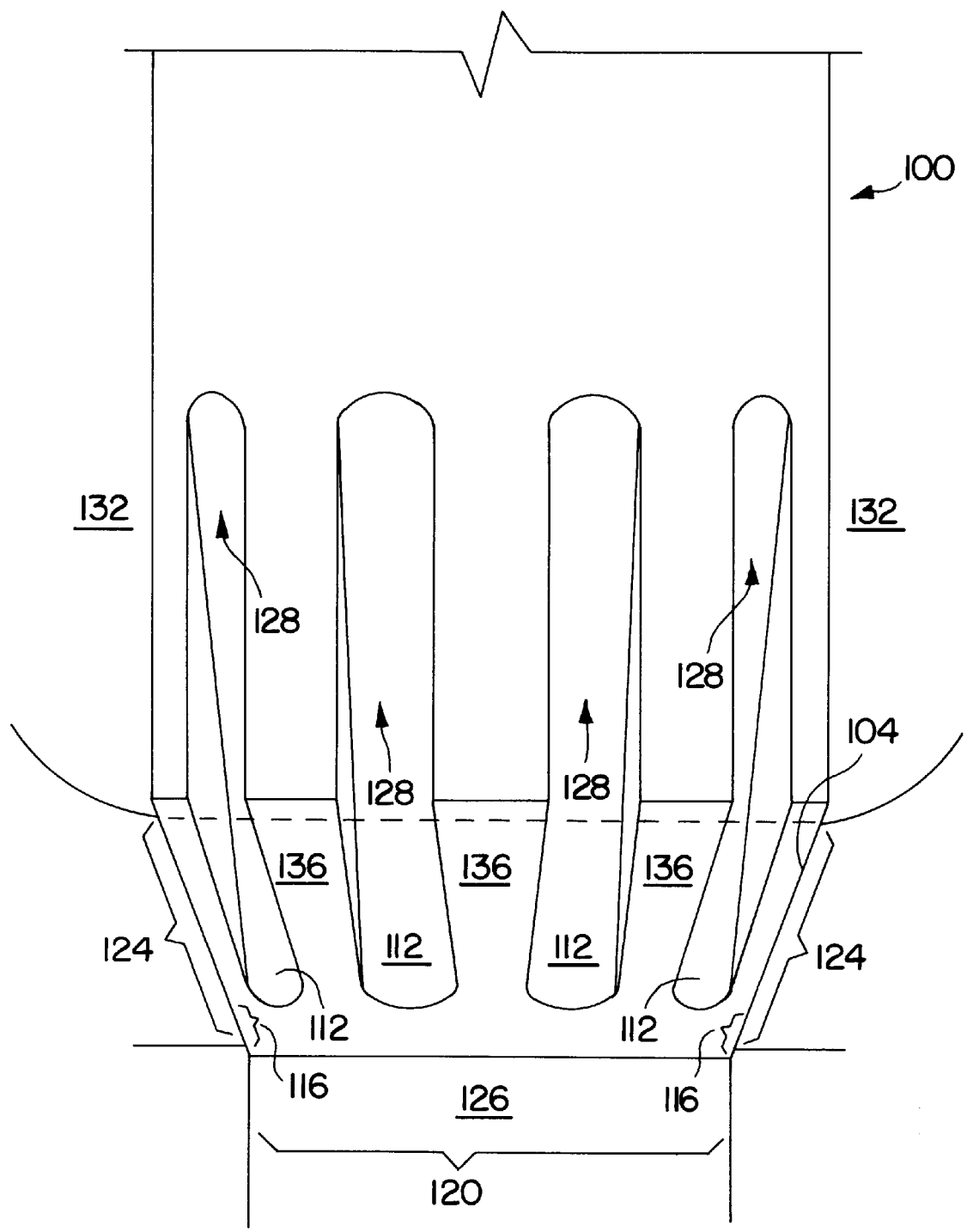
FIG. 7 shows the valve stem of FIG. 4 closing a valve gate.

Specifically, FIG. 7 shows stem 100 closing a gate 120 as sealing portion 116 of stem 100 engages a complementary tapered gate sealing portion 124, thus preventing molten material from entering gate channel 126. Molten material which would otherwise be trapped between tapered portion 104 and tapered gate portion 124 is expressed through channels 112, as indicated by arrows 128, to the melt channel 132 of the injection molding nozzle. Presently, channels 112 are sized, spaced and located with respect to sealing portion 116 such that material to be expressed from between sealing portion 116 and gate sealing portion 124 need travel no more than a maximum distance of ½ of a millimeter before entering a channel 112. Thus, when sealing portion 116 engages gate sealing portion 124, material which would otherwise form a thin film layer between the sealing portions is easily expressed into channels 112. A suitable maximum distance which the molten material need travel before entering a channel 112 will vary depending upon the molten material, the closing pressure of the valve stem and other factors, as will be apparent to those of skill in the art.

As shown in the Figure, while sealing portion 116 is relatively small, the actual contact between the tip of stem 100 and gate 120 occurs over a larger area. Specifically, in addition to sealing portion 116, the lands 136 between channels 112 also contact gate sealing portion 124 and thus a relatively large surface contact area is obtained between the tip of stem 100 and gate 120 to enhance the transfer of thermal energy therebetween when gate 120 is cooled. With the present invention, the contact area between the tip of stem 100 and gate 120 can be increased, as desired, to obtain desired thermal transfer conditions without the normally associated disadvantages of increased amounts of material being trapped between the sealing portions of the gate and tip of the stem.

In a presently preferred embodiment of the invention, stem 100 is a unitary piece and channels 112 are formed into the surface of stem 100, by machining, electro-winnowing or by any other suitable technique, as will occur to those of skill in the art. However, it is also contemplated that the tip of stem 100 can be a separate piece, joined to shaft 108 by any suitable means, as will occur to those of skill in the art. In this manner, if stem 100 is a unitary piece, it can be constructed from a material with reasonable wear and thermal characteristics, such as H-13 tool steel. If the stem is multi-piece, the tip can be fabricated from a material selected for its wear and/or thermal characteristics, such as titanium or a ceramic material, while shaft 108 can be fabricated from another material, such as H-13 tool steel.

It is also contemplated that channels 112 need not be straight channels, as shown in FIGS. 4 through 7, and can instead be placed in a helical, or other desired arrangement around the tip. Also, the cross sectional area of channels 112 can change between sealing portion 116 and shaft 108, for example increasing as channels 112 extend back from sealing portion 116.

Figure 8:
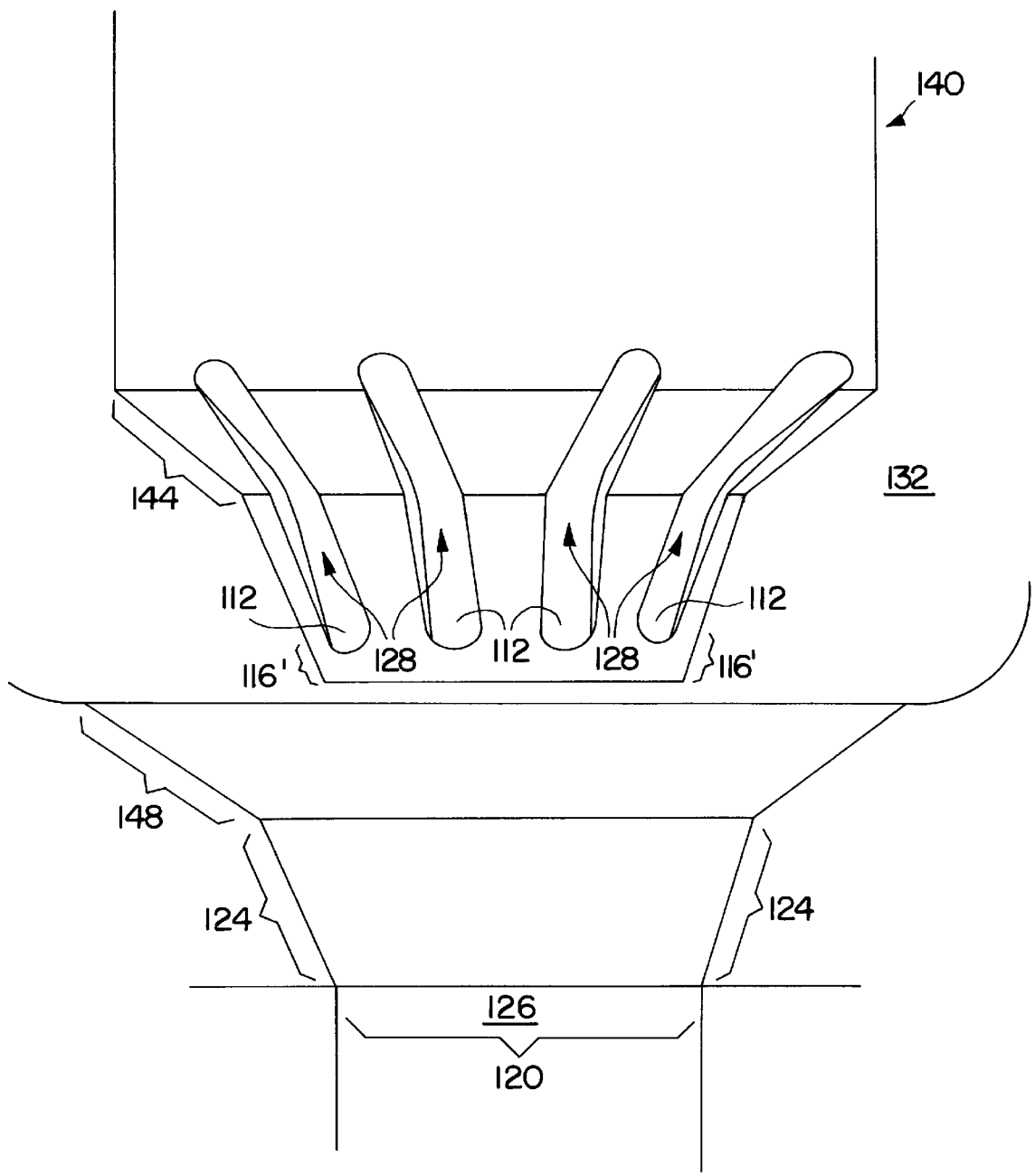
FIG. 8 shows a side view of a stem tip and cross-section of a gate in a valve gated injection molding system in accordance with the present invention.

It is also contemplated that the tapered portion of the stem can include two or more different tapers. FIG. 8 shows a stem and valve gate similar to that shown in FIGS. 4 through 7 and wherein similar features are indicated with the same reference numbers as used in FIGS. 4 through 7. Specifically, tip 140 includes a sealing portion 116 having a taper complementary to gate sealing portion 124 and a portion 144 with a different taper to engage a second portion 148 of gate 120 that has a complementary taper. This allows the total amount of contact surface area between the tip of stem 140 and gate 120 to be sized as desired. As will be apparent to hose of skill in the art, additional tapered regions can also be employed if desired.

Figure 9:
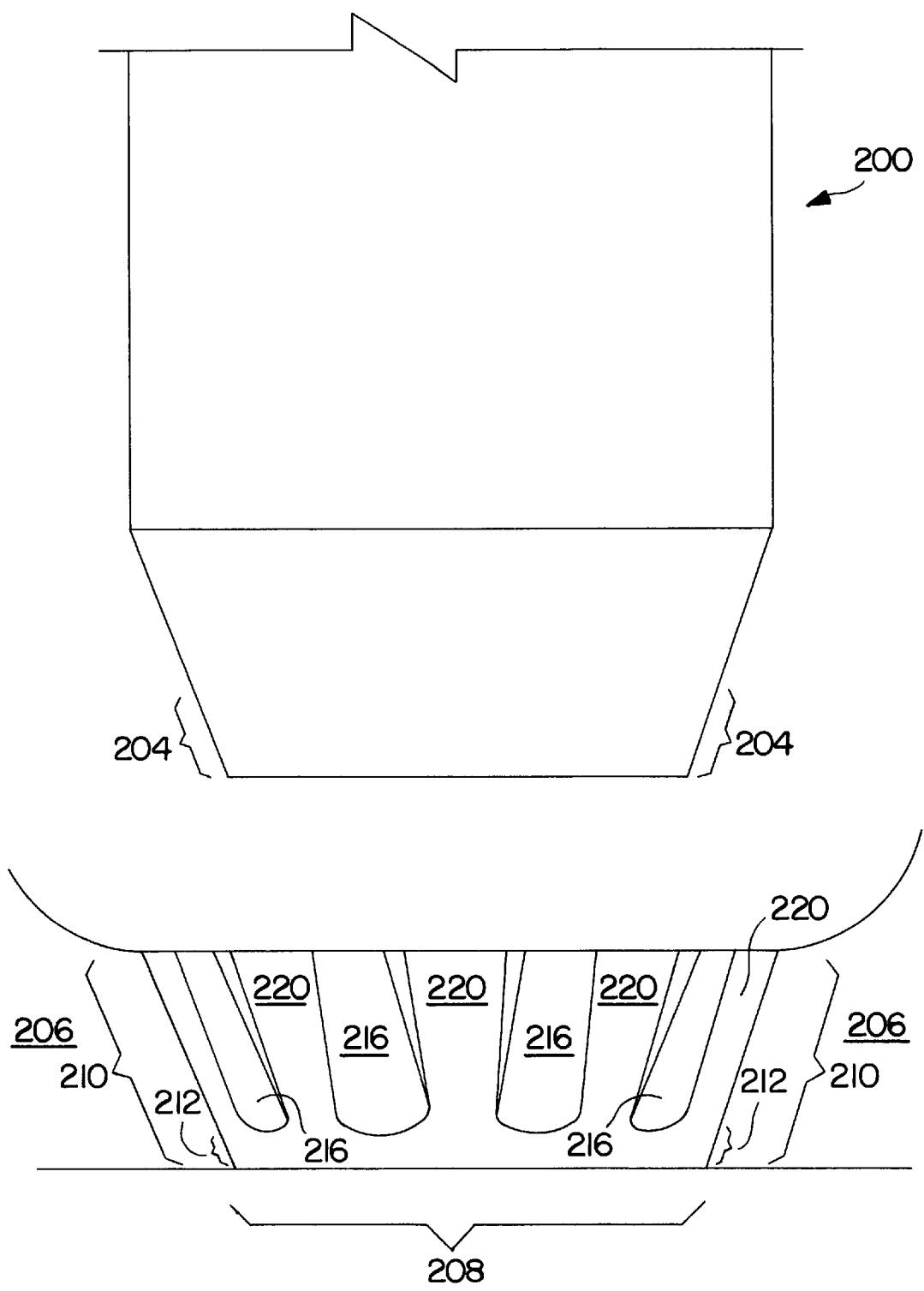
FIG. 9 shows a side view of a stem tip and cross-section of a gate in accordance with another embodiment of the present invention.

FIG. 9 shows another embodiment of the present invention wherein the tip of valve stem 200 is conventional and includes a tapered tip with a sealing portion 204. Mold plate 206 has a gate 208 that includes a tapered portion 210, which is tapered in a complementary manner to the tip of stem 200, and which includes a sealing portion 212. Tapered portion 210 includes channels 216 that extend from immediately above gate sealing portion 212 to the top of gate 208 adjacent the injection nozzle melt channel (not shown). As with the embodiment of FIGS. 4 through 7, stem 200 can be moved from the open position illustrated in the Figure to a closed position (not shown) wherein tip sealing portion 204 engages gate sealing portion 212 to close gate 208.

As tip sealing portion 204 approaches gate sealing portion 212, molten material which would otherwise be trapped between the sealing portions is expressed into channels 216 and up to the melt channel of the injection molding nozzle. The expressing of material into channels 216 from between sealing portions 204 and 212 permits the tip of stem 200 to substantially completely enter gate 208. This inhibits the formation of gate vestiges and allows stem 200 and gate 208 to be designed such that the total contact area between the tip of stem 200 and gate 208 can be significantly larger than the area of contact between sealing portions 204 and 212, thus allowing improved thermal transfer between the tip of stem 200 and gate 208 as gate 208 is cooled during the cooling portion of the injection cycle. Specifically, the lands 220 between channels 216 can also contact the tip of stem 200, providing a greater area over which thermal energy transfer can occur.

It is contemplated that channels 216 can be formed in gate 208 is a variety of manners including conventional machining operations, electro-winnowing, or by any other suitable method as will occur to those of skill in the art. Further, while gate 208 is illustrated as being a unitary piece in mold plate 206, it is also contemplated that gate 208 can include a removable gate ring insert etc. with channels 216 formed therein. As will be apparent to those of skill in the art, in such a case, the gate ring insert can be fabricated from a different material than the rest of gate 208 and examples of suitable materials include titanium, ceramics, etc.

As discussed above with respect to the embodiment of FIGS. 4 through 7, the contact area between sealing portions 204 and 212 is preferably complementary in taper and the remainder of the tapered portion of gate 208 and the tip of stem 200 can have different tapers, similar to the embodiment of FIG. 8, to allow the total contact area between the tip of stem 200 and gate 208 to be selected as desired.

The present invention provides a novel valve gated injection molding system and valve gate which reduces the formation of gate vestiges on parts molded therewith and which enhances cooling of the tip of the valve stem during the cooling portion of an injection molding cycle. The provision of channels which extend from an area adjacent the contact area of the sealing portions of the stem tip and gate to the melt channel of the injection nozzle allows material, which would otherwise form a thin film layer in the contact area of the sealing portions, to be expressed through the channels and back to the injection nozzle. Furthermore, an increased contact area, in addition to the contact area of the tip and gate sealing portions, allows improved transfer of heat energy from the tip to the gate, when the gate is cooled.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A valve gate for opening and closing a mold gate between a melt channel in an injection molding nozzle and a mold cavity, comprising:

a mold gate including a tapered portion having a gate sealing portion;

a valve stem having a tip including a tapered portion having a valve stem sealing portion, the tapered portion of said mold gate and the tapered portion of the tip each being tapered from a first diameter to a second diameter smaller than the first diameter, at least one of the tapered portion of said mold gate and the tapered portion of the tip further including a plurality of channels extending from an area adjacent the smaller second diameter to the injection molding nozzle; and an operating means connected to said valve stem and operable to move said valve stem between an open position, wherein molten material can flow from the melt channel into the mold cavity, and a closed position, wherein the valve stem sealing portion engages said gate sealing portion to prevent flow of the molten material from the melt channel into the mold cavity and express molten material from between the respective sealing portions into the channels.

2. A valve gate according to claim 1, wherein the plurality of channels are formed in said mold gate.

3. A valve gate according to claim 1, wherein the plurality of channels are formed in said valve stem.

4. A valve gate according to claim 1, wherein said valve stem is hollow.

5. A valve gate according to claim 1, wherein at least a portion of lands between the plurality of channels form part of a total contact surface area between the tip and said mold gate when said valve stem is in the closed position.

6. A valve gate according to claim 3, wherein said valve stem further comprises a shaft portion and a tip portion, said tip portion being formed of a different material than said shaft portion.

7. A valve gate according to claim 6, wherein the different material is a ceramic thermal insulator.

8. A valve gate according to claim 6, wherein the different material is titanium.

9. A valve gate according to claim 2, wherein said mold gate further comprises a gate body and a gate insert comprising the tapered portion of said mold gate, said gate insert being formed of a different material than said gate body.

10. A valve gate according to claim 9, wherein the different material is a ceramic thermal insulator.

11. A valve gate according to claim 9, wherein the different material is titanium.

12. A valve gate according to claim 1, wherein at least one of the tapered portion of the tip and the tapered portion of said mold gate includes two different tapers.

13. A valve gate according to claim 1, wherein the plurality of channels are equally spaced about the respective sealing portion.

14. A valve gate according to claim 1, wherein the channels extend parallel to a length of said valve stem.

15. A valve gated injection molding system comprising:

a mold gate including a tapered portion having a gate sealing portion;

an injection molding nozzle having a melt channel to provide molten material from an injection molding machine to said mold gate;

a valve stem having a tip including a tapered portion having a valve stem sealing portion, the tapered portion of said mold gate and the tapered portion of the tip each being tapered from a first diameter to a second diameter smaller than the first diameter, at least one of the tapered portion of said mold gate and the tapered portion of the tip further including a plurality of channels extending from an area adjacent the smaller second diameter to the melt channel; and an operating means connected to said valve stem and operable to move said valve stem between an open position, wherein molten material can flow from the melt channel through said mold gate, and a closed position, wherein the valve stem sealing portion engages said gate sealing portion to prevent flow of the molten material from the melt channel through said mold gate and express molten material from between the respective sealing portions into the channels.

* * * * *